United States Patent
Bronczyk et al.

(10) Patent No.: US 9,316,543 B2
(45) Date of Patent: Apr. 19, 2016

(54) TEMPERATURE TRANSMITTER TRANSIENT PROTECTOR

(71) Applicant: Rosemount Inc., Chanhassen, MN (US)

(72) Inventors: Andrew James Bronczyk, Chanhassen, MN (US); Aaron Andrew Perrault, Shakopee, MN (US); Frank L. Green, Chanhassen, MN (US)

(73) Assignee: Rosemount Inc., Chanhassen, MN (US)

( * ) Notice: Subject to any disclaimer, the term of this patent is extended or adjusted under 35 U.S.C. 154(b) by 493 days.

(21) Appl. No.: 13/826,629

(22) Filed: Mar. 14, 2013

(65) Prior Publication Data

US 2014/0269829 A1    Sep. 18, 2014

(51) Int. Cl.
*G01K 1/00* (2006.01)
*G01K 1/08* (2006.01)
*G01K 1/02* (2006.01)
*G01D 21/00* (2006.01)

(52) U.S. Cl.
CPC .......... *G01K 1/08* (2013.01); *G01D 21/00* (2013.01); *G01K 1/024* (2013.01); *G01K 2215/00* (2013.01)

(58) Field of Classification Search
CPC combination set(s) only.
See application file for complete search history.

(56) References Cited

U.S. PATENT DOCUMENTS

| | | | |
|---|---|---|---|
| 6,356,191 B1 * | 3/2002 | Kirkpatrick et al. | 340/501 |
| 6,578,429 B1 * | 6/2003 | Danna et al. | 73/732 |
| 7,421,258 B2 * | 9/2008 | Bauschke et al. | 455/128 |
| 2002/0108448 A1 * | 8/2002 | Behm et al. | 73/753 |
| 2004/0158334 A1 | 8/2004 | Kirkpatrick et al. | |
| 2005/0079833 A1 | 4/2005 | Bauschke et al. | |
| 2005/0195093 A1 | 9/2005 | Karschnia et al. | |
| 2009/0030634 A1 | 1/2009 | Schumacher | |
| 2010/0123591 A1 | 5/2010 | Bauschke et al. | |
| 2010/0302008 A1 | 12/2010 | Engelstad et al. | |
| 2012/0006120 A1 | 1/2012 | Hedtke | |

OTHER PUBLICATIONS

International Search Report and Written Opinion for PCT Application Serial No. PCT/US2014/016408; Dated May 28, 2014, 13 pages.

* cited by examiner

*Primary Examiner* — Lisa Caputo
*Assistant Examiner* — Nasir U Ahmed
(74) *Attorney, Agent, or Firm* — Kinney & Lange, P.A.

(57) ABSTRACT

A process sensor assembly comprises a hollow protective housing, a temperature sensor, a process transmitter, and a transient protector. The temperature sensor includes a probe extending out of the hollow protective housing to a sensing location, and a top plate movably secured to the hollow protective housing so as to allow travel within the hollow protective housing with vibrations of the probe. The process transmitter is configured to process and transmit sensor signals from the temperature sensor, and is retained on the top plate to move with the temperature sensor within the hollow protective housing. The transient protector is configured to condition power for to the process transmitter, and is anchored to the process transmitter so as to move with the process transmitter within the hollow protective housing.

20 Claims, 3 Drawing Sheets

TEMPERATURE TRANSMITTER TRANSIENT PROTECTOR

BACKGROUND

The present invention relates generally to industrial process field devices, and more particularly to DIN-type temperature transmitters.

The term "field device" covers a broad range of process management devices that measure and control parameters such as pressure, temperature, and flow rate. Many field devices include transmitters that act as communication relays between a transducer for sensing or actuating an industrial process variable, and a remote control or monitoring device such as a computer in a control room. The output signal of a sensor, for example, is generally insufficient to communicate effectively with a remote control or monitoring device. A transmitter bridges this gap by receiving communication from the sensor, converting this signal to a form more effective for longer distance communication (for example, a modulated 4-20 mA current loop signal, or a wireless protocol signal), and transmitting the converted signal to the remote control or monitoring device.

Process transmitters are used to monitor a variety of parameters of industrial processes, including pressure, temperature, viscosity, and flow rate. Each field device typically comprises a sealed enclosure containing a transmitter, one or more sensors, and connecting electronics. Process transmitters comprise wired or wireless transceivers, as well as electronics for processing sensor and control signals, diagnostic reports, and for receiving power. Large scale industrial manufacturing facilities typically employ many field devices distributed across a wide area. These field devices usually communicate with a common control or monitoring device, allowing industrial processes to be centrally monitored and controlled.

Sensor assemblies for sensing process fluid temperatures and changes in temperature commonly include at least one temperature sensor such as a thermocouple, resistive temperature detector, or thermistor housed in a thermowell extending into the fluid flow. The thermowell protects the temperature sensor from physical damage caused by direct contact with the process fluid (e.g. impacts, corrosion, etc.), while efficiently conducting heat between the fluid and the temperature sensor. DIN-type temperature sensors, in particular, comprise long, slender probes that extend from a flat mounting plate to a sensor tip containing a sensor element. The elongated probe situates the sensor tip at the bottom of the thermowell, surrounded by the process flow. Impingement of the thermowell on process flow creates turbulence in the process fluid via vortex shedding. This turbulence, in turn, contributes to vibration of both the thermowell and the sensor probe inside it. To avoid sensor damage caused by this vibration, many sensor assemblies mount the sensor flexibly with respect to process piping (e.g. via a spring loaded assembly), allowing the probe to move together with the vibrating thermowell. Flying leads connect the sensor probe to signal processing electronics within the process transmitter.

Field devices can be powered by direct electrical connection to power utilities such as 120V AC utilities, by control system DC power supplies, by energy storage devices such as long-life chemical batteries or supercapacitors, or by local power sources such as solar panels or vibrational energy harvesters. Field devices powered by local power sources or utility grids may experience transient power surges that can damage or degrade sensitive process transmitter electronics.

SUMMARY

The present invention is directed toward a process sensor assembly comprising a hollow protective housing, a temperature sensor, a process transmitter, and a transient protector. The temperature sensor includes a probe extending out of the hollow protective housing to a sensing location, and a top plate movably secured to the hollow protective housing so as to allow travel within the hollow protective housing. The process transmitter is configured to process and transmit sensor signals from the temperature sensor, and is retained on the top plate to move with the temperature sensor within the hollow protective housing. The transient protector is configured to condition power to the process transmitter, and is anchored to the process transmitter so as to move with the process transmitter within the hollow protective housing.

DETAILED DESCRIPTION

The present invention is a transient protector configured to attach to and move together with a DIN (German Institute for Standardization)-type temperature transmitter secured to a DIN temperature sensor.

Figure 1:
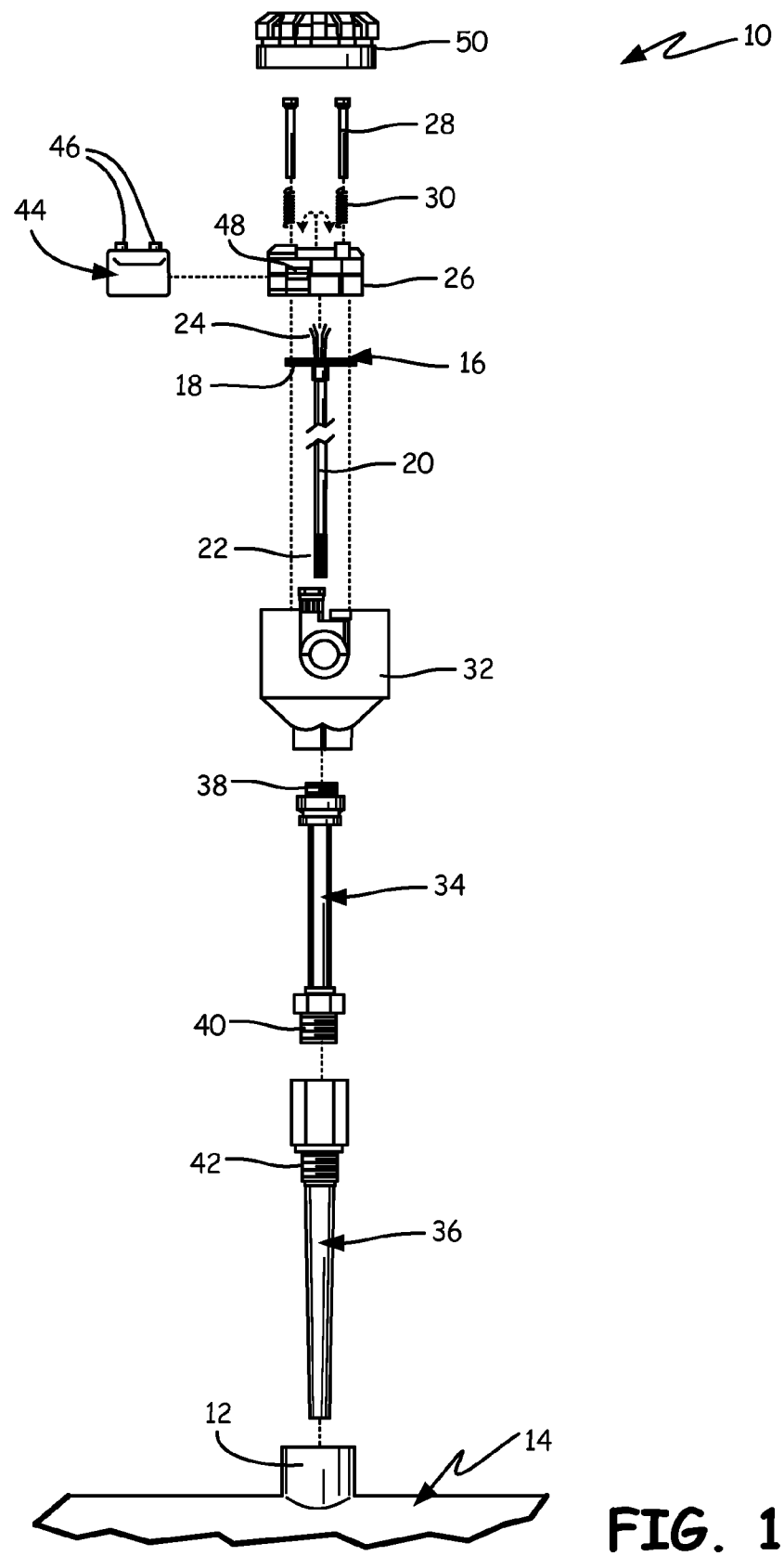
FIG. 1 is an exploded view of a process sensor assembly including a process transmitter and a transient protector.

FIG. 1 depicts process sensor assembly 10, comprising process connection 12 on process piping 14, sensor 16 (with top plate 18, probe 20, sensor tip 22, and flying leads 24), process transmitter 26, fasteners 28, springs 30, connection head 32, extension 34, thermowell 36, threading 38, 40, and 42, transient protector 44 (with transient protector terminals 46), mating connection 48, and connection head cover 50.

Sensor assembly 10 is a system for monitoring temperature or change in temperature of a process fluid near process connection 12 of process piping 14. Process piping 14 is a duct or tube carrying fluid flow for an industrial process. Process piping 14 may, for instance, be configured to carry a viscous fluid such as an oil slurry or a viscous manufacturing material. Process connection 12 is an attachment point that facilitates the connection of a flange mounted instrument to measure at least one characteristic of process flow F; in this case, temperature. Process connection 12 is depicted as a threaded nipple connection, but may in other embodiments be a flange connection, or any other appropriate sealing connection type. Process piping may additionally feature a plurality of flange connections for mounting other transducers, such as flow rate, pressure or pH sensors. In the illustrated embodiment, process connection 12 provides an attachment point for thermowell 36 and probe 20, and an aperture in process piping 14 through which thermowell 36 and probe 20 can extend to situate sensor tip 22 inside process fluid flow. Process fluids may, for instance, include chemicals or particulates that can be damaging or otherwise detrimental to the operation of sensor 16. For applications where direct exposure to process fluid flow is unlikely to erode sensor 16, thermowell 36 may in some instances be replaced by other fluid seals sufficient to protect electronics of process transmitter 26 and sensor 16 from harm.

Sensor 16 is a DIN-type temperature sensor with top plate 18, probe 20, sensor tip 22, and flying leads 24. Top plate 18 is an anchor plate with attachment holes for movably securing sensor 16 to connection head 32. When process sensor assembly 10 is fully assembled, top plate 18 abuts the bottom of process transmitter 26. Probe 20 is a narrow, elongated tube extending from top plate 18 to sensor tip 22. Probe 20 passes through extension 34 and into thermowell 36 to situate sensor tip 22 at the bottom of thermowell 36. Sensor tip 22 is a temperature sensitive transducer portion of sensor 16 containing a sensor such as a resistive temperature detector (RTD) or thermocouple used to sense process fluid temperature or change in temperature. When process sensor assembly 10 is fully assembled, sensor tip 22 is situated at the bottom extent of thermowell 36, within process piping 14 and adjacent process fluid flow through thermowell 36. Flying leads 24 are wired connections extending from probe 20 at top plate 18. Flying leads 24 connect sensor 16 to process transmitter 26, as described in further detail below with respect to FIGS. 2a and 2b.

Process transmitter 26 is a signal processing and/or transmission device that receives and processes signals from sensor 16 to produce at least one measurement of temperature or change in temperature in the process flow. Process transmitter 26 may, for instance, be a logic-capable device configured to extract a digital process measurement from voltage or current signals received from sensor 16. Process transmitter 26 may further include diagnostic or failure reporting components, and may include persistent memory to store measurement, control, and diagnostic data relating to sensor performance and/or process parameters. Process transmitter 26 need not be a temperature-specific component, but may instead be capable of interfacing with a variety of different sensor types. In the illustrated embodiment, process transmitter 26 transmits temperature measurements to a remote device such as a control or monitoring system or a measurement data backup server. Process transmitter 26 may be a wireless or wired transmitter. In some embodiments, process transmitter 26 may include or be attached to a local operator interface including, for example, a screen and/or keypad.

Fasteners 28 and springs 30 flexibly secure sensor 16 and process transmitter 26 to connection head 32. Fasteners 28 can, for example, be screws, bolts, or pins that pass vertically (according to the orientation of FIGS. 1, 2a, and 2b) through apertures in process transmitter 26 and sensor 16, and anchor in connection head 32. Fasteners 28 may, in some embodiments, screw into threading within connection head 32. Springs 30 are disposed between heads of fasteners 28 and process transmitter 26. Springs 30 flexibly retain process transmitter 26 and sensor 16 such that sensor tip 22 is situated at the bottom extent of thermowell 36, while taking in tolerances to allow sensor 16 and process transmitter 26 to maintain direct contact with thermowell 26. This freedom of movement prevents impact damage to sensor 22 during environmental disturbances such as vibration. Process transmitter 26 and sensor 16 move together, so that flying leads 24 are not disconnected or disrupted by movement of sensor 16.

Connection head 32 is a protective casing or housing disposed about process transmitter 26 and transient protector 44 to protect sensitive electronics therein. In the depicted embodiment, connection head 32 is mounted on extension 34 via threading 38. As depicted, extension 34 is a rigid coupling that supports connection head 32 at a distance from process piping 14, and carries sensor probe 20. Extension 34 may, for instance, distance process transmitter 26 from high-temperature processes within process piping 14, thereby protecting sensitive electronics from exposure to excessive temperatures. Although connection head 32 is shown mounted to extension 34, some embodiments of process system 10 may instead mount connection head 32 directly to thermowell 36, eschewing extension 34. Thermowell 36 is a protective body that surrounds probe 20 and sensor tip 22 within process piping 14. Thermowell 36 may, for instance, be a hollow tapered sheath affixed to and disposed through process connection 12 via threading 42. In alternative embodiments, thermowell 36 may interface with process connection 12 via a flat face seal, or other fluid seal. Thermowell 36 may, in various embodiments, be formed of brass, steel, copper, or any other material with high thermal conductance, so as to efficiently conduct heat from process fluid to sensor tip 22.

As described in further detail below with respect to FIGS. 2a and 2b, process transmitter 26 receives power serially through transient protector 44 from a power source. Transient protector 44 receives power from transient protector power terminals 46, and conditions this power for use by process transmitter 26. Transient protector power terminals 46 may, for instance, receive power via leads connecting to an energy harvesting device, control system power supply, or utility grid (not shown). Transient protector 44 attaches to process transmitter 26 via mating connection 48, such that transient protector 44 travels together with process transmitter 26 and sensor 16 with vibration of thermowell 36. Mating connection 48 may, for instance, be a dovetail slot and tab connection. Once transient protector 44 and process transmitter 26 are both installed within connection head 32, connection head cover 50 attaches to connection head 32 to seal process transmitter 26, transient protector 44, and sensor 16 from the environment.

Figure 2A:
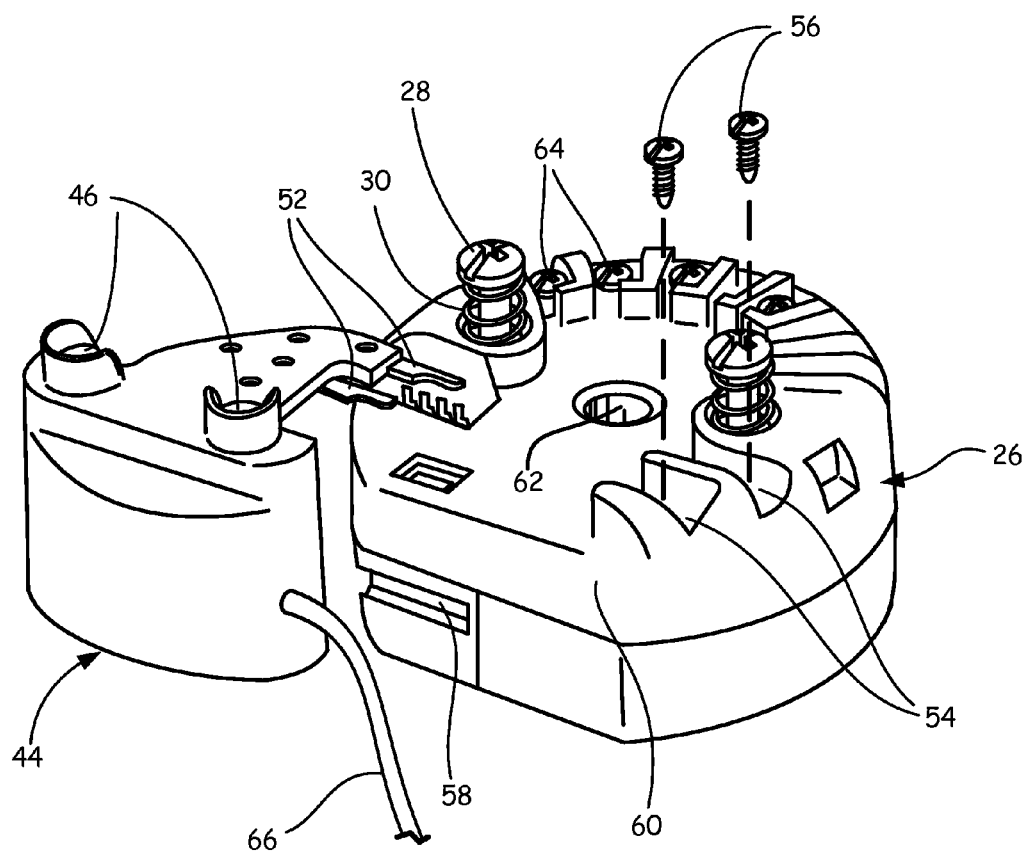
FIGS. 2a and 2b are perspective views of the process transmitter and transient protector of FIG. 1.
Figure 2B:
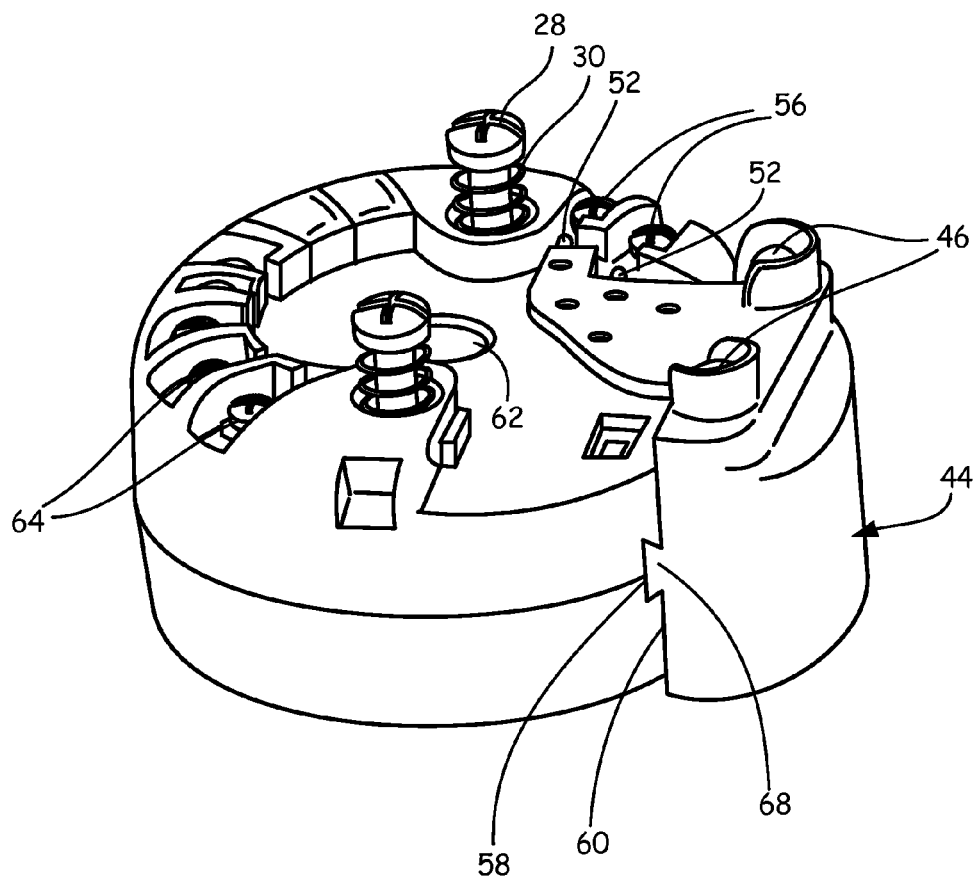

FIGS. 2a and 2b are two perspective views of a single embodiment of process transmitter 26 and transient protector 44. FIG. 2a shows transient protector 44 detached from process transmitter 26, while FIG. 2b shows transient protector 44 fastened to process transmitter 26. FIGS. 2a and 2b depict process transmitter 26, fasteners 28, springs 30, transient protector 44, transient protector power terminals 46, power connection tabs 52, process transmitter power terminals 54, power terminal screws 56, mating connection 58 on flat surface 60, flying lead hole 62, sensor terminals 64, flexible ground 66, and mating connection 68.

As described above with respect to FIG. 1, process transmitter 26 is a signal processing and/or transmission device that receives and processes temperature signals from sensor 16. Process transmitter 26 is flexibly retained to connection head 32 by springs 30 and fasteners 28, such that process transmitter 26 abuts top plate 18, and rides up and down fasteners 28 together with sensor 16. The flexible coupling provided by fasteners 28 and springs 30 between process transmitter 26 and connection head 32 takes in tolerances to ensure that sensor tip 22 remains in contact with the bottom of thermowell 36, even during vibrations or shocks to thermowell 36. Process transmitter 26 receives sensor inputs from sensor 16 via flying leads 24, which pass up through flying lead hole 62, and attach to sensor terminals 64. Sensor terminals 64 are depicted as screw terminals, but may more generally be any type of sensor signal connection. Sensor terminals 64 may, in some embodiments, provide a connection interface for multiple sensors 16, and/or for output lines transmitting sensor readouts to an external device such as a control or monitoring system. Alternatively or additionally, process transmitter 26 may be a wireless device capable of communicating with a control or monitoring system, and/or with other process transmitters, via wireless communication.

Process transmitter 26 can be powered via transient protector 44 through power conduction tabs 52, which interface with process transmitter power terminals 54 in the illustrated embodiment. As shown, process transmitter power terminals 54 are conductive screw terminals with power terminal screws 56 configured to accept power leads. In alternative embodiments, process transmitter power terminals 54 may instead be plug terminals or other non-screw terminals. Power conduction tabs 52 are conductive interfaces that meet process transmitter power terminal 54 and power terminal screws 56 to provide an electrical path from transient protector 44 to process transmitter 26. Transient protector 44 is a power conditioning module that acts as a surge protector, shielding process transmitter 26 from potentially harmful voltage spikes. Transient protector 44 may, for instance, include a plurality of diodes, high voltage fuses, and/or metal oxide varistors (MOVs), and is configured with a let-through voltage suitable for use by process transmitter 26. In the depicted embodiment, transient protector 44 receives power from an external source via transient protector power terminals 46 (e.g. through cables or wiring running through conduit passages in connection head 32 or connection head cover 50). Although transient protector power terminals 46 are depicted as conductive screw terminals, alternative embodiments of transient protector 44 may for instance use plug or clip terminals. Transient protector 44 is rated to a voltage level sufficient to handle expected surge values, which may vary depending on the power source. A utility grid power source, for instance, may necessitate a higher-rated transient protector 44 than a low power energy harvester, or a local generator. In some embodiments, transient protector 44 may contain further power conditioning electronics such as a voltage rectifier or inverter.

Transient protector 44 attaches to mating connection 58 of process transmitter 26. In the depicted embodiment, mating connection 58 is a dovetail slot disposed across half or less of flat surface 60, which is a flat face of process transmitter 26 disposed to receive transient protector 44. Mating connection 58 interfaces with mating connection 68, depicted as a complementary dovetail tab. As depicted, connection 58 extends across less than half of flat surface 60 so as to prevent transient protector 44 from binding to process transmitter 26 and preventing transient protector 44 from being removed from process transmitter 26. In alternative embodiments of process transmitter 26 and transient protector 44, mating connections 58 and 68 may comprise one or more other configurations of slots, tabs, or catches suited to align power conduction tabs 52 with process transmitter power terminals 54, and secure transient protector 44 to process transmitter 26. In the depicted embodiment, flat surface 60 truncates the otherwise cylindrical shape of process transmitter, allowing both transient protector 44 and process transmitter 26 to fit within the limited confines of connection head 32 without striking or rubbing against connection head 32 when transient protector 44 and process transmitter 26 move relative to connection head 32 with sensor 16. More generally, transient protector 44 and process transmitter 26 are contoured to fit within connection head 32 when process sensor assembly 10 is fully assembled.

In the depicted embodiment, transient protector 44 slideably interfaces with process transmitter 26. Transient protector 44 is installed by sliding transient protector from the position shown in FIG. 2a to the position shown in FIG. 2b. Mating connections 58 and 68 serve both to align and to secure transient protector 44 relative to process transmitter 26, such that power conduction tabs 52 slide into contact with process transmitter power terminals 54. Power terminal screws 56 both electrically connect power conduction tabs 52 to process transmitter power terminal 54, and lock transient protector 44 into its installation position relative to process transmitter 26.

In the depicted embodiment, transient protector 44 includes flexible ground 66, a wired ground connection that terminates at connection head 32. In such embodiments, connection head 32 is a conductive body that grounds transient protector 44 to process piping 14. In alternative embodiments, flexible ground 66 may take other forms suited to ground transient protector 44 to connection head 32 without restricting the movement of transient protector 44, process transmitter 26, and sensor 16 relative to connection head 32. In one such alternative flexible ground configuration, transient protector 44 may include a wired connection or a conductive tab or spring connection that contacts connection head 32 via fasteners 28. According to this embodiment, fasteners 28 are formed of a conductive material that provides a ground path between transient protector 44 and connection head 32.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A process sensor assembly comprising:
   a hollow protective housing;
   a temperature sensor that includes a probe extending out of the hollow protective housing to a sensing location, and a top plate movably secured to the hollow protective housing so as to allow the temperature sensor to travel with respect to the hollow protective housing in response to vibrations of the probe and assembly manufacturing tolerances;
   a process transmitter configured to process and transmit sensor signals from the temperature sensor, and retained on the top plate to move with the temperature sensor within the hollow protective housing; and
   a transient protector configured to condition power for the process transmitter, and anchored to the process transmitter to move with the process transmitter within the hollow protective housing.

2. The process sensor assembly of claim 1, wherein the temperature sensor is a DIN-type temperature sensor.

3. The process sensor assembly of claim 1, further comprising a flexible ground connection between the transient protector and the hollow protective housing.

4. The process sensor assembly of claim 3, wherein the flexible ground connection comprises a connection to a conductive fastener of the process transmitter and top plate to the hollow protective housing.

5. The process sensor assembly of claim 4, wherein the conductive fastener is a bolt or pin passing through the transmitter and top plate and fixed to the hollow protective housing to flexibly retain the temperature sensor and process transmitter within the hollow protective housing.

6. The process sensor assembly of claim 3, wherein the flexible ground connection comprises a flexible ground wire from the transient protector to the hollow protective housing.

7. The process sensor assembly of claim 1, wherein the process transmitter comprises a substantially flat face with a first mating connection, and the transient protector comprises a second mating connection complementary to the first, such that the first and second mating connections slideably engage to retain the transient protector on the process transmitter.

8. The process sensor assembly of claim 7, wherein the first and second mating connection comprises a mating dovetail slot and tab.

9. The process sensor assembly of claim 7, wherein the first mating connection extends across only a portion of the flat face.

10. The process sensor assembly of claim 7, wherein the transient protector is configured to be locked in place via power terminal screws once the first and second mating connections are fully engaged.

11. The process sensor assembly of claim 1, wherein the process transmitter includes power terminals configured to receive power leads, and wherein the transient protector includes tabs configured to slideably engage the power terminals.

12. The process sensor assembly of claim 11, wherein the process transmitter includes power terminal screws disposed to secure the power leads or the tabs to the process transmitter.

13. A process transmitter assembly comprising:
   a process transmitter configured to move together with and receive sensor signals from a DIN temperature sensor;
   a spring loaded fastener configured to secure the process transmitter to a housing while allowing the process transmitter to move together with the DIN temperature sensor with respect to the housing; and
   a transient protector removably anchored to the process transmitter so as to move together with both the process transmitter and the DIN temperature sensor, and configured to provide power to the process transmitter while protecting against voltage transients.

14. The process transmitter assembly of claim 13, wherein the spring loaded fastener comprises:
   a pin or bolt passing through the process transmitter and the DIN temperature sensor, and rigidly secured to the housing; and
   a spring disposed between the process transmitter and the pin or bolt to flexibly retain the process transmitter.

15. The process transmitter of claim 14, wherein the pin or bolt provides a conductive ground path for the transient protector.

16. The process transmitter of claim 13, further comprising a flexible ground wire from the transient protector to the housing.

17. The process transmitter of claim 13, wherein the transient protector is removably anchored to the process transmitter via a dovetail interface that slideably engages the transient protector with the process transmitter.

18. The process transmitter of claim 17, wherein slideably engaging the transient protector with the process transmitter aligns power conduction tabs of the transient protector with power terminals of the process transmitter.

19. The process transmitter of claim 18, further comprising power terminal screws that engage with power terminal and power conduction tabs to lock the transient protector to the process transmitter.

20. The process transmitter of claim 13, wherein the housing fully encloses the process transmitter, the transient protector, and the spring loaded fastener.

\* \* \* \* \*